(No Model.) 7 Sheets—Sheet 1.

W. B. WESTLAKE.
MACHINERY FOR THE MANUFACTURE OF ARTIFICIAL FUEL.

No. 489,136. Patented Jan. 3, 1893.

Witnesses:
E. B. Bolton
S. J. Jones

Inventor:
William B. Westlake
By
his Attorneys.

(No Model.) 7 Sheets—Sheet 2.

W. B. WESTLAKE.
MACHINERY FOR THE MANUFACTURE OF ARTIFICIAL FUEL.

No. 489,136. Patented Jan. 3, 1893.

Attest
Wallen Donaldson
Wm. T. Hall

Inventor
Wm. B. Westlake
by Richards & Co
Attys (No Model.) 7 Sheets—Sheet 4.

W. B. WESTLAKE.
MACHINERY FOR THE MANUFACTURE OF ARTIFICIAL FUEL.

No. 489,136. Patented Jan. 3, 1893.

Witnesses

Inventor:
William B. Westlake
By
his Attorneys.

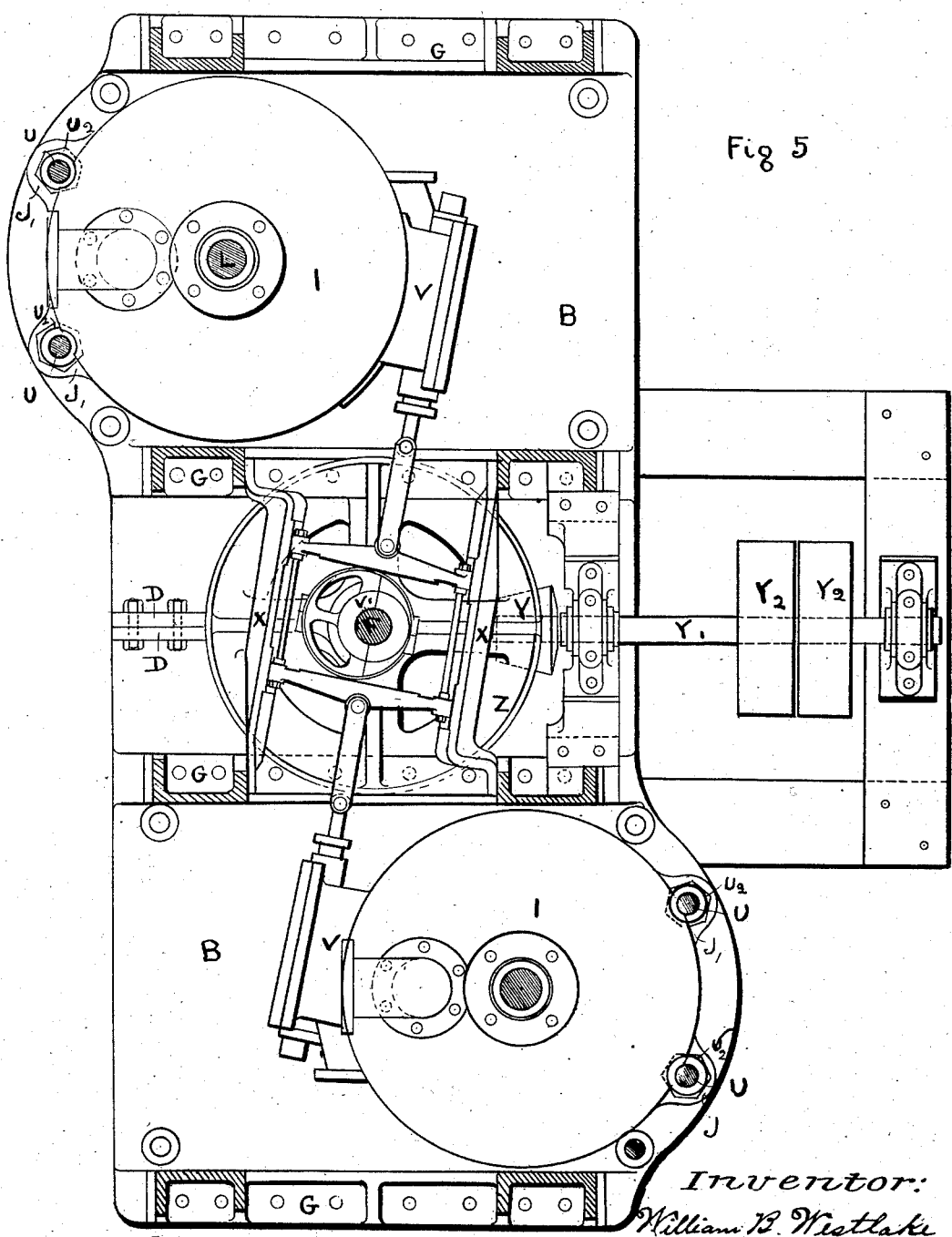

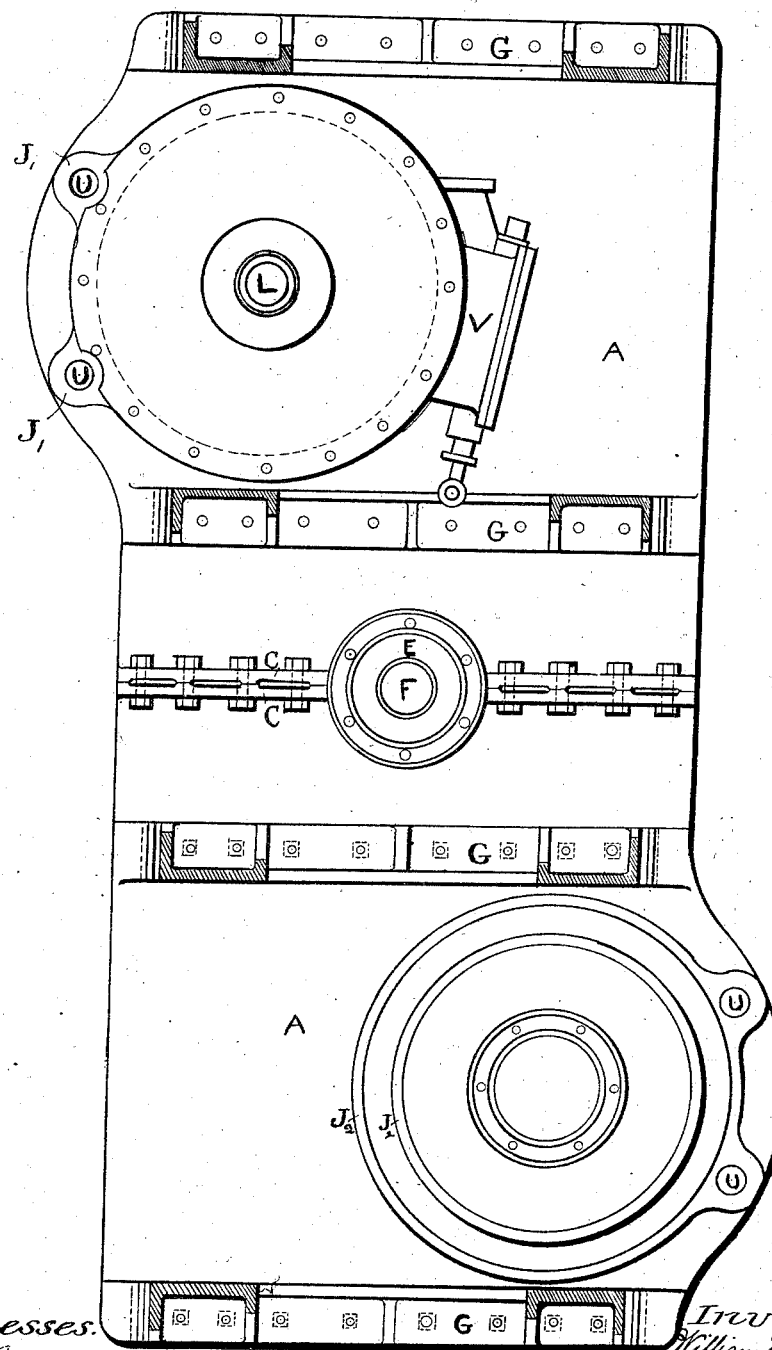

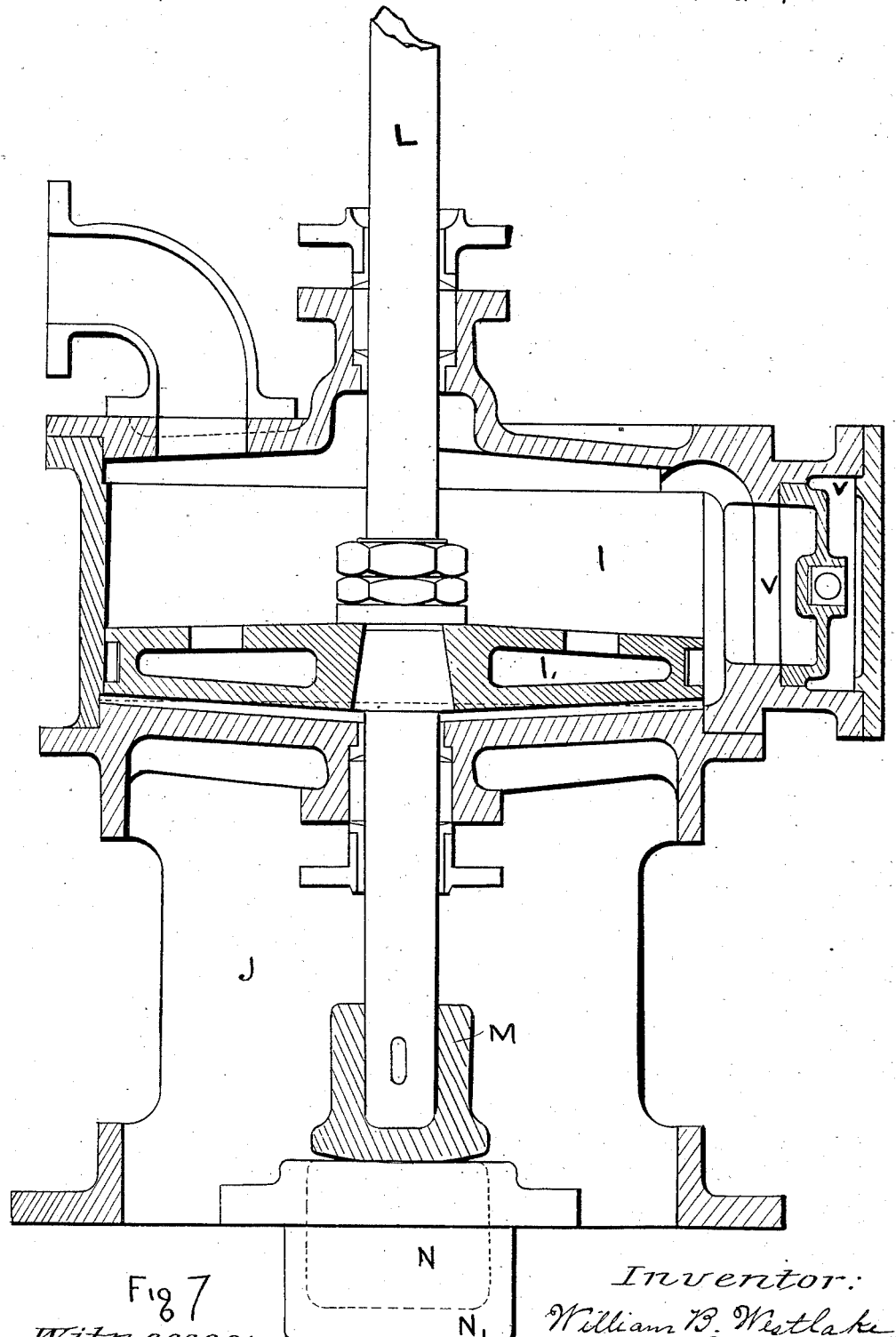

United States Patent Office.

WILLIAM B. WESTLAKE, OF SWANSEA, ENGLAND.

MACHINERY FOR THE MANUFACTURE OF ARTIFICIAL FUEL.

SPECIFICATION forming part of Letters Patent No. 489,136, dated January 3, 1893.

Application filed November 27, 1891. Serial No. 413,349. (No model.) Patented in England January 3, 1891, No. 166.

*To all whom it may concern:*

Be it known that I, WILLIAM BONFIELD WESTLAKE, a subject of the Queen of Great Britain and Ireland, residing at 19 Northampton Place, Swansea, in the county of Glamorgan, England, have invented certain new and useful Improvements in Machinery or Apparatus for the Manufacture of Artificial Fuel or other Like Material, (for which I have been granted Letters Patent in Great Britain, No. 166, dated January 3, 1891,) of which the following is a specification.

My improvements relate particularly to that class of machinery employed in molding small coal or other material into blocks of artificial coal or briquettes of either material, and have for their first object the provision of a simple and effective means by which said material can be compressed into blocks; the cylinders, valve motion and other gearing, for applying necessary pressure, being severally fixed, secured or working below the level of the whole table so that the latter and other gearing for working are easily interchanged in case of repairs, alterations &c., which are from time to time required.

Figure 1:
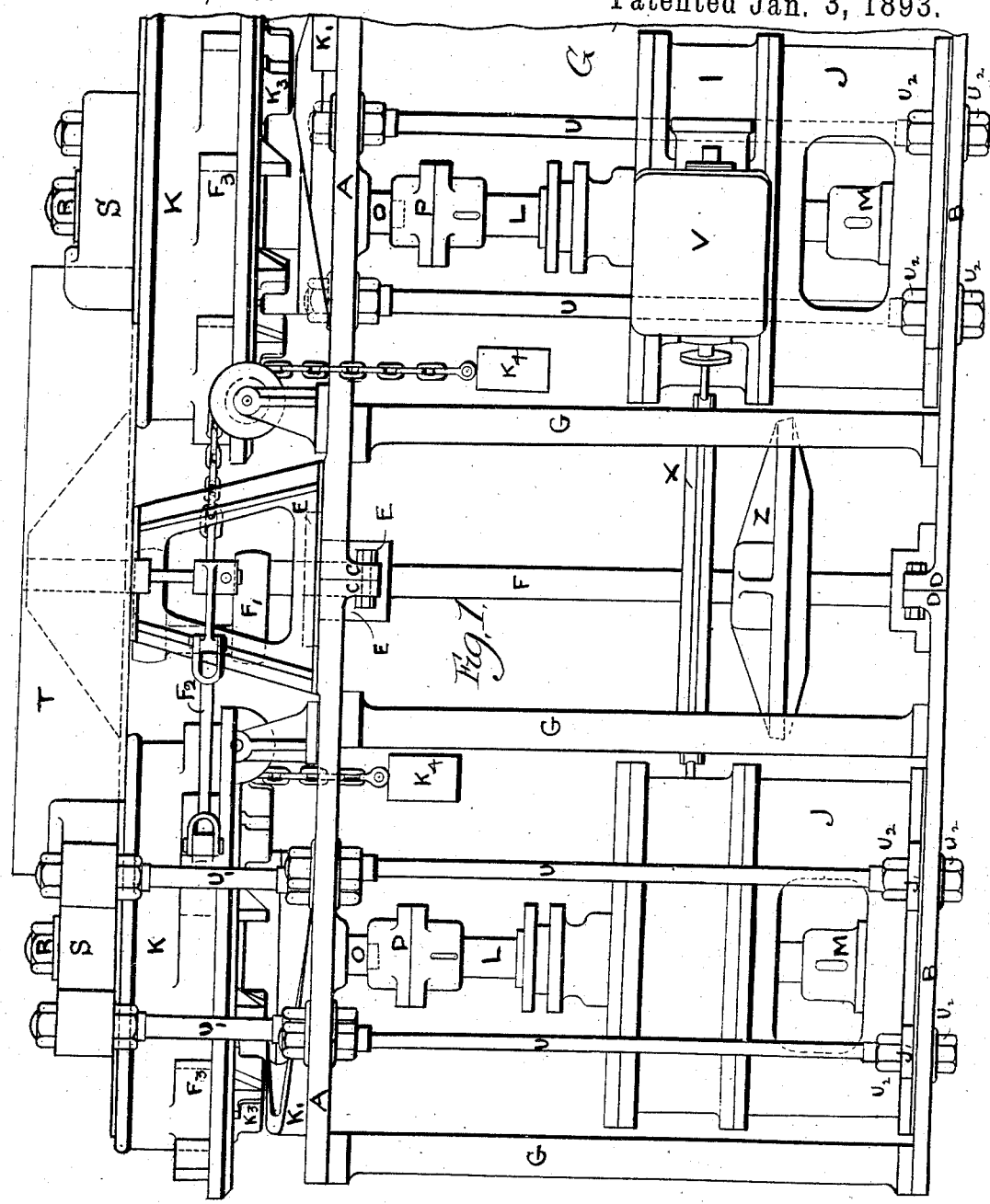
Figure 2:
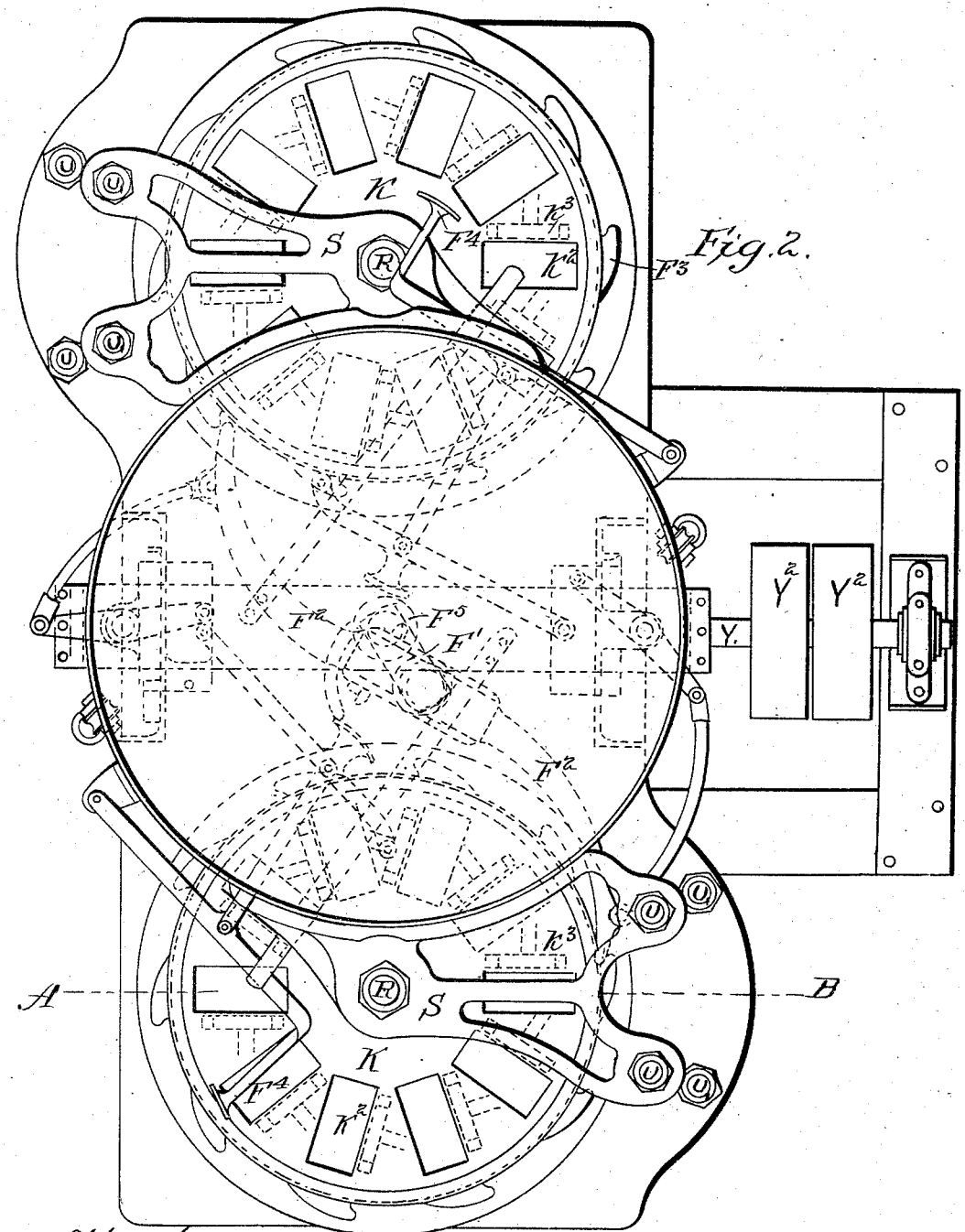
Figure 3:
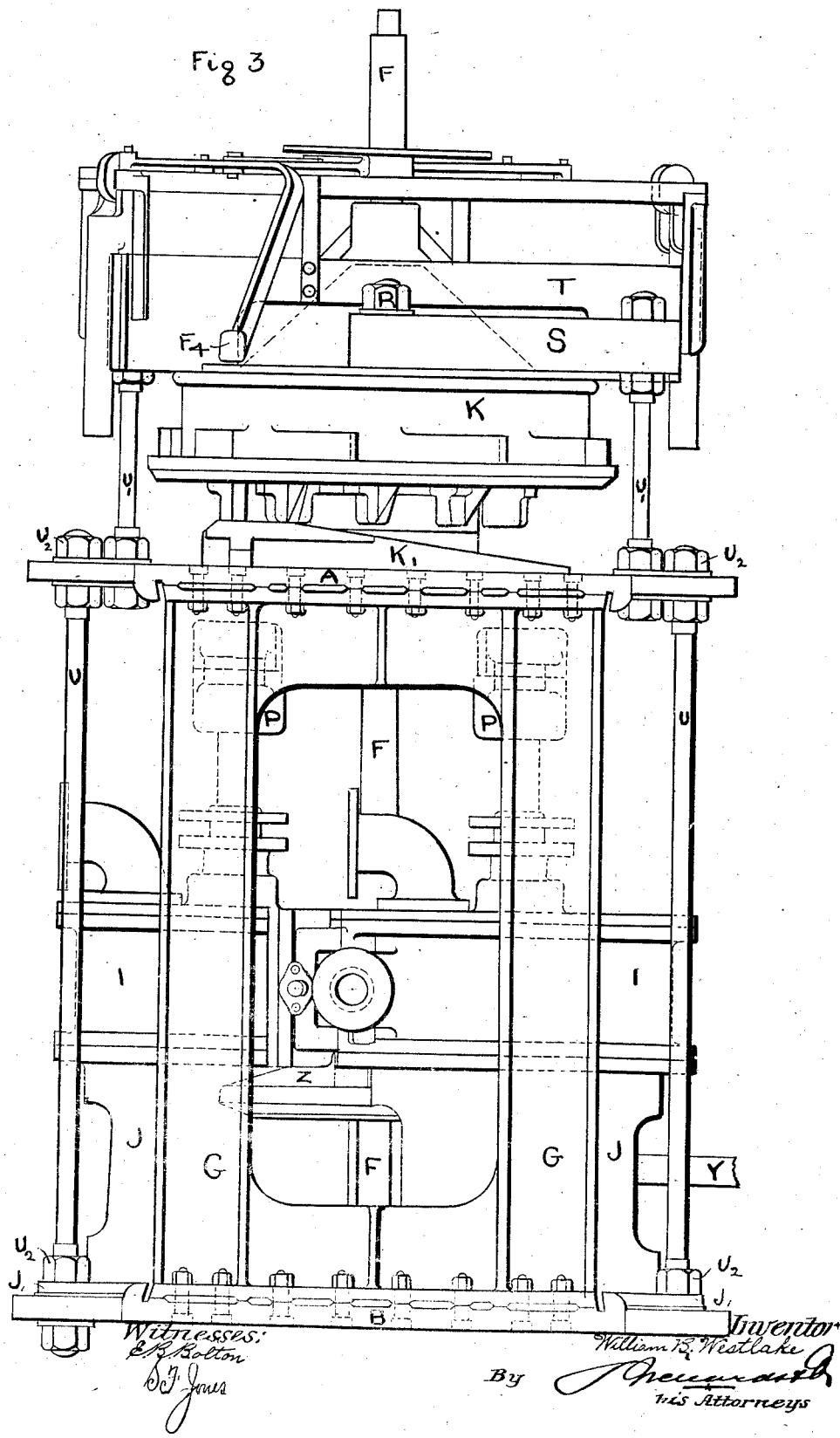
Figure 4:
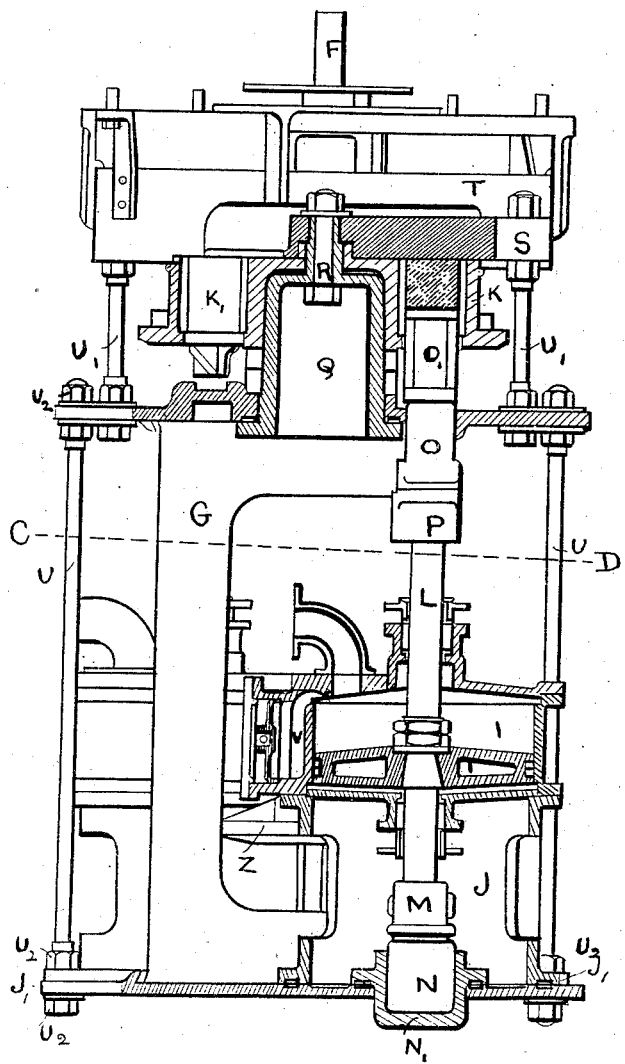

In the accompanying drawings, forming part of this specification, Figure 1 represents an elevation of press showing the relative positions of cylinders I and stand J, coupling P, buffer-head O and the mold table K, also the coupling and guide E, and crank-shaft F. Fig. 2 is a plan giving the positions of the combined pan T and pressing plate S; also the poles $F^2$, which gearing into teeth $F^3$ cast under the mold table K give the latter an intermittent motion; also the position of kickers for the removal of the block. Fig. 3 is an end elevation of press, showing the method of securing plates A and B to uprights G, by suitable poles, and also the bolts $u$ passing through the bottom of stand J and secured at the top and bottom by nuts. Fig. 4 is a section through A B Fig. 2, and shows the mold table K resting on the capstan $q$ (round which it revolves) through the top of which passes a solid pin P securing it to the pressing plate S: also the stamp $o$, in the mold K, with material between it and the pressing plate S previous to compression by admission of steam below piston $l$, raising buffer-head O. Fig. 5 is a section through C D, Fig. 4 and gives details of valve motion necessary to give steam admittance and exhaust for raising and lowering the piston, piston rod and buffer-head O; also plan of the lug I, cast on bottom flange of stand J through which the bolt V passes. Fig. 6 is a sectional view giving details of the devices for coupling the two halves A A by angle pieces C C and by the coupling E. Fig. 7 is an enlarged section through the cylinder and stand showing the buffer M, hollow pot N, and buffer block N'.

In carrying my invention into effect, I (first) cast the top and bottom plates A A, B B in two halves and securely fasten them by bolts passing through angle pieces C C, D D, and the coupling device E, shown more particularly in Figs. 1 and 6. This coupling device is a cast-iron, brass-bushed recessed coupling which is securely bolted to the two halves A A, and passes through an accurately bored space left in the two halves, this coupling also forms a guide for the upright crank shaft F which passes through K.

(Second.) Erect and secure the top and bottom plates A and B to a series (preferably) of upright cast or wrought iron plates G by strong bolts particularly as shown in Fig. 3.

(Third.) Place a cylinder and stand J between the top and bottom plates A and B; which is truly turned at bottom and fits accurately over and upon chipping strips $J^2$ $J^2$ (shown in Fig. 6.) This stand I has strong lugs cast upon it, which are accurately bored or drilled to take the upright stay bolts U which pass through them, also through the top and bottom plates A and B, to which the said bolts are made firm by nuts $U^2$ $U^2$, thus securing a good foundation for pressing contained within itself.

(Fourth.) Provide the piston rod L with a buffer M at its lower end to strike on a cast iron block contained in a hollow pot N, which same pot N, is secured to a buffer-head O, by a heavy flange coupling P. This buffer head O is raised against the stamp $o'$ (Fig. 4) rising and falling in the mold $K^2$.

of the mold table K (Fig. 2) and traveling with the latter being guided by pieces K³, (Figs. 1 and 2.)

(Fifth.) Provide a hollow capstan q and a solid pin P the capstan passing through the top bed-plate A, bolted securely to underneath the bed-plate A, then passing through the center of mold table K, which revolves round it; the pin P passing through the hollow capstan q, holding down the pressing plate S on the top of the mold table K.

(Sixth.) Provide a combined pan T, and pressing plate S preferably by bolting the pressing plate S to the pan T and securing it against upward pressure by stay bolts U, U, passing through it to the top plate A.

(Seventh.) Work the valve V by an eccentric V', on the vertical crank shaft F which gives motion to the eccentric V' and pawls F².

I will now proceed to describe the method of working of the said improved machinery or apparatus for the molding of artificial fuel or other materials.

The crown wheel Z and the shaft F revolve by means of a bevel wheel Y, keyed to the driving shaft Y', which is again driven by means of a belt round the pulleys Y² (Fig. 5) and from the main pulleys. The revolution of F causes the eccentric V' to work between guides X X and to open and close the steam and exhaust ports within the valve chest V, causing the piston l', piston rod L and buffer-head O to rise and fall at prescribed intervals.

The mold tables K receive their intermittent motion in the following manner:—The crank F' on the shaft F (Figs. 1 and 2) has one end of each of the pawls F², F² secured to it, the other ends of F² being pointed to fit into the teeth F³ of the mold table. On the revolution of the crank shaft each pawl is alternately fixed into the tooth F³, which causes the mold table to revolve a space corresponding to the distance between the centers of molds K²: the said pawls being brought back by a weight K⁴ on the further revolution of the crank F'. The kickers for the removal of each fuel block after completion of each block, are actuated from the shaft F by a cam F⁵ (Fig. 2). The material falls in the molds K² which come inside the pan T; on the revolution of the mold table K, the mold and stamp come directly under the pressing plate S (as shown in Fig. 4) when steam is admitted below the piston l, raising the buffer-head o, against the stamp o', compressing the material against the plate S; on the further revolution of the mold table the stamp o' is gradually raised by passing up the inclined surface K' until the top of stamp is on a level with the top of mold table K, when the block is removed by the kicker F⁴ (Figs. 2 and 3) and it will be readily understood that the gearing is so arranged that two or more molds are filling one block compressing and one block being removed between each intermittent movement of mold table.

Having now particularly described and ascertained the nature of my said invention and in what manner the same is to be performed, I declare that what I claim is 1. In combination the mold tables K arranged adjacent to each other and supported to revolve and having teeth F³, the shaft extending between the tables and having a crank portion F', the pawl arms F² extending on opposite sides of the shaft and engaging the teeth of the mold table and the compressing mechanism substantially as described.

2. In combination the revolving mold table having a series of molds, the pressing plate arranged at one point in the movement of the table and over the molds, the said plate being stationary with relation to the revolving table, the stamp operating in the mold and the means for operating the said stamp while the mold is below the pressure plate, said means operating on the end of the stamp opposite to the pressure-plate, substantially as described.

3. In combination the revolving mold table carrying a series of molds, the stationary pressure plate to cover one of said molds and arranged over the table, the stamp in the molds and the buffer head O, arranged at one point in the movement of the table to engage the lower end of the stamp and press the same upward toward the pressing plate the means for moving the table forward step by step and the means for continuing the upward movement of the stamps as the table moves forward and carries the mold from below the pressing plate.

4. In combination, the vertical shaft, the revolving mold table on each side of the same, the teeth on said tables the pawl connections from the shaft to each table to give the same step by step movement, the kicker arms also operated from the vertical shaft, said kicker arms extending over the mold table on each side of the shaft and the connections from the shaft to the kicker arms substantially as described.

5. In combination, the vertical shaft, the rotary table, carrying the molds, the pressing plate located over the table and to cover one of the molds the piston and buffer head arranged on the underside of the table below the pressing plate, the steam valve, and the means for operating the table and the steam valve consisting of the pawl connections from the table to the shaft and the eccentric and rod connections from the said shaft to the valve, substantially as described.

6. In apparatus for pressing artificial fuel or other material the combined recessed bush and guide E forming a portion of the coupling devices joining the two halves of A and B, substantially as described.

7. In apparatus for pressing artificial fuel or other material, the hollow pot N', Figs. 4 and 7 for the purpose of receiving a buffer block such as N; substantially as described.

8. In apparatus for, pressing artificial fuel or other material, the hollow capstan $q$, containing a solid pin R holding the pressing plate down, as near to, and as far from the revolving table as is found necessary for the purpose as hereinbefore described.

W. B. WESTLAKE.

Witnesses:
 JOHN W. ADAMS,
 I. E. WILLIAMS,
*Both of 60 St. Helen's Avenue, Swansea.*